United States Patent
Lee (10) Patent No.: US 9,825,312 B2
(45) Date of Patent: Nov. 21, 2017

(54) APPARATUS FOR MANUFACTURING MEMBRANE-ELECTRODE ASSEMBLY FOR FUEL CELL AND MEMBRANE-ELECTRODE ASSEMBLY MANUFACTURED USING THE SAME

(71) Applicant: Hyundai Motor Company, Seoul (KR)

(72) Inventor: Sun Ho Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 94 days.

(21) Appl. No.: 14/846,787

(22) Filed: Sep. 6, 2015

(65) Prior Publication Data

US 2016/0111734 A1    Apr. 21, 2016

(30) Foreign Application Priority Data

Oct. 21, 2014  (KR) .................. 10-2014-0142799

(51) Int. Cl.
| | |
|---|---|
| H01M 8/00 | (2016.01) |
| H01M 8/0276 | (2016.01) |
| H01M 8/0286 | (2016.01) |
| H01M 8/1018 | (2016.01) |

(52) U.S. Cl.
CPC .......... *H01M 8/0276* (2013.01); *H01M 8/00* (2013.01); *H01M 8/0286* (2013.01); *H01M 2008/1095* (2013.01); *Y02P 70/56* (2015.11)

(58) Field of Classification Search
None
See application file for complete search history.

(56) References Cited

U.S. PATENT DOCUMENTS

| | | | |
|---|---|---|---|
| 2004/0220048 A1* | 11/2004 | Leban ............ | H01M 2/18 502/101 |
| 2004/0241525 A1* | 12/2004 | Mekala ........... | H01M 4/8828 156/263 |

(Continued)

FOREIGN PATENT DOCUMENTS

| | | |
|---|---|---|
| JP | 2005-050583 A | 2/2005 |
| JP | 2010-514102 A | 4/2010 |

(Continued)

*Primary Examiner* — Scott J Chmielecki
(74) *Attorney, Agent, or Firm* — Mintz Levin Cohn Ferris Glovsky and Popeo, P.C.; Peter F. Corless (57) ABSTRACT

An apparatus for manufacturing a membrane-electrode assembly for a fuel cell is provided. The apparatus includes a sub-gasket feeding unit that forms first electrode windows, unrolls a first sub-gasket sheet, and supplies the sheet to a transfer line. An electrode membrane loading unit installed over the transfer line forms electrode catalyst layers on both faces of an electrolyte membrane, collects the electrode membrane sheet cut, and loads the sheets onto first electrode windows. A sub-gasket loading unit installed over the transfer line forms second electrode windows, collects a second sub-gasket sheet, and loads the sheets on the electrode membrane sheet. MEA bonding units installed on the transfer line bond the first sub-gasket sheet, the electrode membrane sheet, and the second sub-gasket sheet mutually stacked while passing the first sub-gasket sheet, the electrode membrane sheet, and the second sub-gasket sheet between a pair of hot rollers along the transfer line.

12 Claims, 7 Drawing Sheets

(56) References Cited

U.S. PATENT DOCUMENTS

| | | | | |
|---|---|---|---|---|
| 2005/0095490 | A1* | 5/2005 | Mittelstadt | H01M 8/0271 429/454 |
| 2007/0129237 | A1* | 6/2007 | Kadotani | B05B 5/057 502/101 |
| 2008/0142152 | A1* | 6/2008 | Debe | H01M 8/0202 156/182 |
| 2009/0017359 | A1* | 1/2009 | Suzuki | H01M 4/8605 429/481 |
| 2009/0255632 | A1* | 10/2009 | Park | B32B 39/00 156/353 |
| 2010/0062304 | A1* | 3/2010 | Okanishi | H01M 8/0273 429/481 |
| 2010/0104913 | A1* | 4/2010 | Yamauchi | H01M 8/0273 429/465 |
| 2011/0151350 | A1* | 6/2011 | Iverson | H01M 8/0273 429/480 |
| 2013/0068371 | A1* | 3/2013 | Lee | B32B 37/00 156/73.1 |
| 2013/0196254 | A1* | 8/2013 | Uehara | H01M 4/8828 429/535 |
| 2015/0217308 | A1* | 8/2015 | Toyoshima | H01M 4/881 118/621 |

FOREIGN PATENT DOCUMENTS

JP         2012-221704 A     11/2012
KR    10-2014-0002016 A     1/2014

* cited by examiner

APPARATUS FOR MANUFACTURING MEMBRANE-ELECTRODE ASSEMBLY FOR FUEL CELL AND MEMBRANE-ELECTRODE ASSEMBLY MANUFACTURED USING THE SAME

CROSS-REFERENCE TO RELATED APPLICATION

This application claims priority to and the benefit of Korean Patent Application No. 10-2014-0142799 filed in the Korean Intellectual Property Office on Oct. 21, 2014, the entire contents of which are incorporated herein by reference.

BACKGROUND (a) Field of the Invention

The present invention relates to a system for manufacturing parts of a fuel cell stack, and more particularly, the present invention relates to an apparatus for manufacturing a Membrane-Electrode Assembly (MEA), which is used to manufacture an MEA for a fuel cell.

(b) Description of the Related Art

A fuel cell produces electricity by electrochemical reactions between hydrogen and oxygen and generates electricity using external chemical reaction materials without a separate charging process. The fuel cell may include separating plates or bipolar plates with a membrane-electrode assembly (MEA) disposed therebetween. A plurality of fuel cells may be continuously arranged to form a fuel cell stack.

Figure 1:
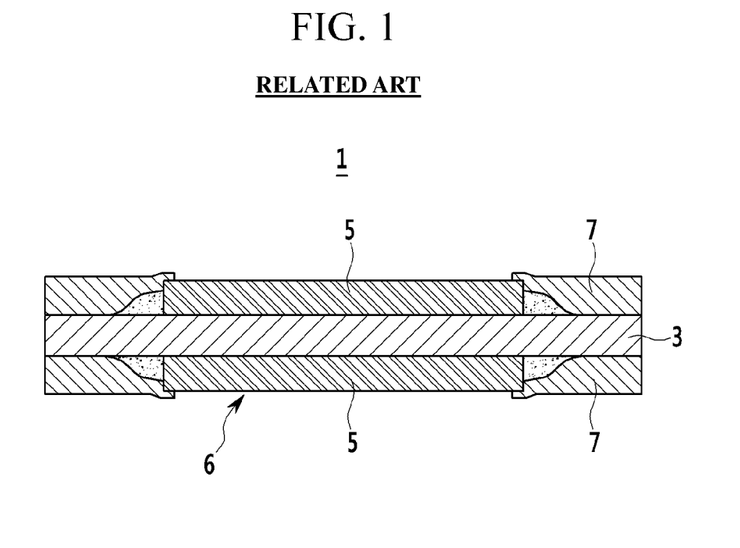
FIG. 1 is a cross-sectional view schematically illustrating an example of a known membrane-electrode assembly according to the related art.

FIG. 1 is a cross-sectional view schematically illustrating an example of a known membrane-electrode assembly according to the related art. Referring to FIG. 1, an exemplary membrane-electrode assembly 1, that is, a core element of the fuel cell, includes an anode and a cathode, that is, electrode catalyst layers 5, on both sides of an electrolyte membrane 3 through which hydrogen ions move. Additionally, the membrane-electrode assembly 1 includes sub-gaskets 7 that protect the electrode catalyst layers 5 and the electrolyte membrane 3 and secure the assembly of the fuel cells.

In a method of manufacturing the membrane-electrode assembly 1, first, an electrode membrane sheet 6 is manufactured using a decal method of unwinding the electrolyte membrane 3 wound in a roll form and consecutively transferring the electrode catalyst layers 5 onto both faces of the electrolyte membrane 3 at a specific interval (e.g., at a pitch of about 150 mm) Thereafter, a membrane-electrode assembly sheet is manufactured using a roll-to-roll method of unwinding and transferring the electrode membrane sheet 6 wound in a roll form, unwinding the sub-gaskets 7 of a roll form and placing the unwound sub-gaskets on both faces of the electrode membrane sheet 6, passing them through hot rollers, and bonding the sub-gaskets 7 on both faces of the electrode membrane sheet.

Particularly, the sub-gaskets 7 are in a state in which electrode windows and manifold windows for opening the electrode catalyst layers 5 are cut. The sub-gaskets 7 may enter both faces of the electrode membrane sheet and may be bonded to both faces of the electrode membrane sheet. After the processes described above is complete, the membrane-electrode assembly sheet wound in a roll form is unwound and cut into a unit form including the electrode catalyst layers 5, to thus manufacture the membrane-electrode assembly 1 as shown in FIG. 1.

In the membrane-electrode assembly 1 of the related art manufactured as described above, the electrode membrane sheet 6 includes the electrode catalyst layers 5 consecutively formed on both faces of the electrolyte membrane 3, and the sub-gaskets 7 are bonded to both faces of the electrode membrane sheet. Accordingly, the electrolyte membrane 3 is disposed in the entire region between the sub-gaskets 7. The development direction of the sub-gaskets 7 used in the membrane-electrode assembly 1 is related to the leakage prevention of a reaction gas or to cell output performance. An effect of the sub-gaskets 7 has not been approved with respect to the mechanical durability of the membrane-electrode assembly 1 and the electrolyte membrane 3.

Accordingly, in the related art, the electrolyte membrane 3 is present in portions where electricity is not generated, that is, the exterior regions of the electrode catalyst layers 5 that generate electricity, since the sub-gaskets 7 related only to the prevention of a leakage of reaction gas and cell output performance are bonded together with the electrolyte membrane 3 interposed therebetween in the portion. Therefore, relatively expensive electrolyte membrane materials are wasted since the electrolyte membrane 3 supporting the sub-gaskets 7 is present in the portion of the membrane-electrode assembly 1 in which electricity is not generated. Thus, the manufacturing costs of the membrane-electrode assembly 1 may increase accordingly.

The above information disclosed in this section is merely for enhancement of understanding of the background of the invention and therefore it may contain information that does not form the prior art that is already known in this country to a person of ordinary skill in the art.

SUMMARY

The present invention provides an apparatus for manufacturing a membrane-electrode assembly for a fuel cell, which may manufacture a membrane-electrode assembly using a mixed flow method of a roll-to-roll method and a sheet loading method to minimize the materials of an electrolyte membrane present between sub-gaskets, that is, portions in which electricity is not generated.

Furthermore, exemplary embodiments of the present invention provide a membrane-electrode assembly for a fuel cell, which is manufactured using a mixed flow method of a roll-to-roll method and a sheet loading method and in which a minimum electrolyte membrane protrudes between sub-gaskets, that is, portions in which electricity is not generated.

An apparatus for manufacturing a membrane-electrode assembly for a fuel cell according to an exemplary embodiment of the present invention may include a sub-gasket feeding unit configured to consecutively form first electrode windows to space the first windows apart from each other at specific intervals, unroll a first sub-gasket sheet wound in a roll form, and supply the first sub-gasket sheet to a transfer line, an electrode membrane loading unit installed over the transfer line and configured to form electrode catalyst layers on both faces of an electrolyte membrane, collect the electrode membrane sheet cut in a unit form, and load the electrode membrane sheets onto first electrode windows of the first sub-gasket sheet, a sub-gasket loading unit installed over the transfer line and configured to form second electrode windows, collect a second sub-gasket sheet cut in a unit form, and load the second sub-gasket sheets on the electrode membrane sheet, and MEA bonding units installed on upper and lower sides of the transfer line and configured to bond the first sub-gasket sheet, the electrode membrane sheet, and the second sub-gasket sheet that are mutually stacked while passing the first sub-gasket sheet, the electrode membrane sheet, and the second sub-gasket sheet between a pair of hot rollers along the transfer line.

The apparatus for manufacturing a membrane-electrode assembly for a fuel cell according to an exemplary embodiment of the present invention may further include a membrane-electrode assembly (MEA) rewinder installed in the rear of the MEA bonding unit and configured to wind an MEA sheet to which the electrode membrane sheet and the second sub-gasket sheet may be bonded on the first sub-gasket sheet by the MEA bonding unit in a roll form. The apparatus may further include a film rewinder installed on a part of the sub-gasket feeding unit and configured to recover a protection film of the first sub-gasket sheet and wind the protection film in a roll form. A film unwinder may be installed on a part of the MEA rewinder and may be configured to unroll the protection film of a roll form and supply the unrolled protection film to the MEA sheet.

Further, the apparatus may include first, second, and third location sensors installed extraneous to the transfer line. In addition, the first location sensor may be configured to detect an edge location of the first electrode window of the first sub-gasket sheet. The second location sensor may be configured to detect an edge location of the electrode membrane sheet and the third location sensor may be configured to detect an edge location of the second electrode window of the second sub-gasket sheet.

The apparatus may further include a vacuum suction unit installed in the transfer line and configured to suction the first sub-gasket sheet and the electrode membrane sheet in a vacuum. An electrostatic generator may be installed over the transfer line and may be configured to generate static electricity in the first sub-gasket sheet to attach the second sub-gasket sheet loaded onto the electrode membrane sheet to the first sub-gasket sheet using the static electricity.

Additionally, in the apparatus for manufacturing a membrane-electrode assembly for a fuel cell according to an exemplary embodiment of the present invention, the electrode membrane loading unit may include a pair of first grippers configured to suction the electrode membrane sheet in a vacuum. The pair of first grippers may be installed to upwardly tilt both ends of the electrode membrane sheet in opposite directions and may be configured to suction both ends of the electrode membrane sheet in a vacuum and apply tension to the electrode membrane sheet. The sub-gasket loading unit may include a pair of second grippers configured to suction the second sub-gasket sheet in a vacuum. The pair of second grippers may be installed to upwardly tilt both ends of the second sub-gasket sheet in opposite directions and may be configured to suction both ends of the second sub-gasket sheet in a vacuum and apply tension to the second sub-gasket sheet.

An apparatus for manufacturing a membrane-electrode assembly for a fuel cell according to an exemplary embodiment of the present invention may include a first sub-gasket feeding unit configured to unroll a first sub-gasket sheet wound in a roll form and supply the first sub-gasket sheet to a transfer line, a first cutting unit installed on a part of the first sub-gasket feeding unit and configured to consecutively form first electrode windows in the first sub-gasket sheet fed through the first sub-gasket feeding unit to space the first electrode windows apart from each other at particular intervals, an electrode membrane loading unit installed over the transfer line and configured to form electrode catalyst layers on both faces of an electrolyte membrane, collect an electrode membrane sheet cut in a unit form, and load the electrode membrane sheets onto the first electrode windows of the first sub-gasket sheet, a second sub-gasket feeding unit installed extraneous to the transfer line and configured to unroll a second sub-gasket sheet wound in a roll form and supply the second sub-gasket sheet to the electrode membrane sheet.

Further, the apparatus may include a second cutting unit installed on a part of the second sub-gasket feeding unit and configured to consecutively form second electrode windows in the second sub-gasket sheet fed through the second sub-gasket feeding unit to space the second electrode windows apart from each other at specific intervals, and MEA bonding units installed extraneous to the transfer line and that bond the first sub-gasket sheet, the electrode membrane sheet, and the second sub-gasket sheet that are mutually stacked while passing the first sub-gasket sheet, the electrode membrane sheet, and the second sub-gasket sheet between a pair of hot rollers.

The apparatus may also include an MEA rewinder installed in the rear of the MEA bonding units and configured to wind an MEA sheet to which the electrode membrane sheet and the second sub-gasket sheet may be bonded on the first sub-gasket sheet by the MEA bonding units in a roll form. A film rewinder may be installed on a part of the sub-gasket feeding unit and may be configured to recover a protection film of the first sub-gasket sheet and wind the protection film in a roll form.

The apparatus may further include a second film rewinder installed on the part of the second sub-gasket feeding unit and configured to recover a protection film of the second sub-gasket sheet and wind the protection film in a roll form. A film unwinder may be installed on a part of the MEA rewinder and may be configured to unroll the protection film of a roll form and supply the unrolled protection film to the MEA sheet. In addition, the electrode membrane loading unit may include a pair of first grippers configured to suction the electrode membrane sheet in a vacuum.

A membrane-electrode assembly for a fuel cell according to an exemplary embodiment of the present invention may be manufactured by the apparatus for manufacturing a membrane-electrode assembly using a roll-to-roll method and a sheet loading method, wherein electrode catalyst layers may be formed on both faces of an electrolyte membrane, sub-gaskets may be respectively formed on the edge sides of the electrode catalyst layers, and the end of the electrolyte membrane may protrude into a first region between the sub-gaskets.

In the membrane-electrode assembly for a fuel cell according to an exemplary embodiment of the present invention, a bonding unit configured to fix the electrolyte membrane and the electrode catalyst layers may be formed in the remaining regions (e.g., regions except for the first region) between the sub-gaskets. The end of the electrolyte membrane may protrude into a partial region of an entire region between the sub-gaskets which may be about 33% of the entire region (e.g., the first region may be about 33% of the entire region).

Exemplary embodiments of the present invention may manufacture the membrane-electrode assembly in which a minimum electrolyte membrane may protrude between the sub-gaskets bonded to the sub-gaskets along with the electrode catalyst layers using a mixed flow method of a roll-to-roll method and a sheet loading method. Accordingly, the electrolyte membrane disposed between the sub-gaskets, that is, portions in which electricity is not generated in the membrane-electrode assembly, may be minimized Thus, the manufacturing costs of a membrane-electrode assembly may be reduced since less materials of a relatively expensive electrolyte membrane are used.

BRIEF DESCRIPTION OF THE DRAWINGS

Reference is made to the following drawings in order to describe exemplary embodiments of the present invention, and thus the technical spirit of the present invention should not be construed as being limited to the accompanying drawings.

DETAILED DESCRIPTION

Hereinafter, the present invention will be described more fully with reference to the accompanying drawings, in which exemplary embodiments of the invention are illustrated. As those skilled in the art would realize, the described exemplary embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to clearly describe the present invention, a description of parts not related to the description is omitted, and the same reference numbers are used throughout the drawings to refer to the same or like parts. Furthermore, the size and thickness of each of elements illustrated in the drawings are arbitrarily illustrated for ease of description, and the present invention is not limited thereto. In the drawings, the thicknesses of parts and regions have been enlarged for clarity.

In addition, in the following detailed description, terms such as first and second are used is to distinguish between elements when the first and second elements have the same construction, and the elements are not limited to such order in the following description. Furthermore, each of terms such as " . . . unit," " . . . means," " . . . part," and " . . . member," described in the specification represent a unit of a comprehensive element that performs at least one function or operation.

Figure 2:
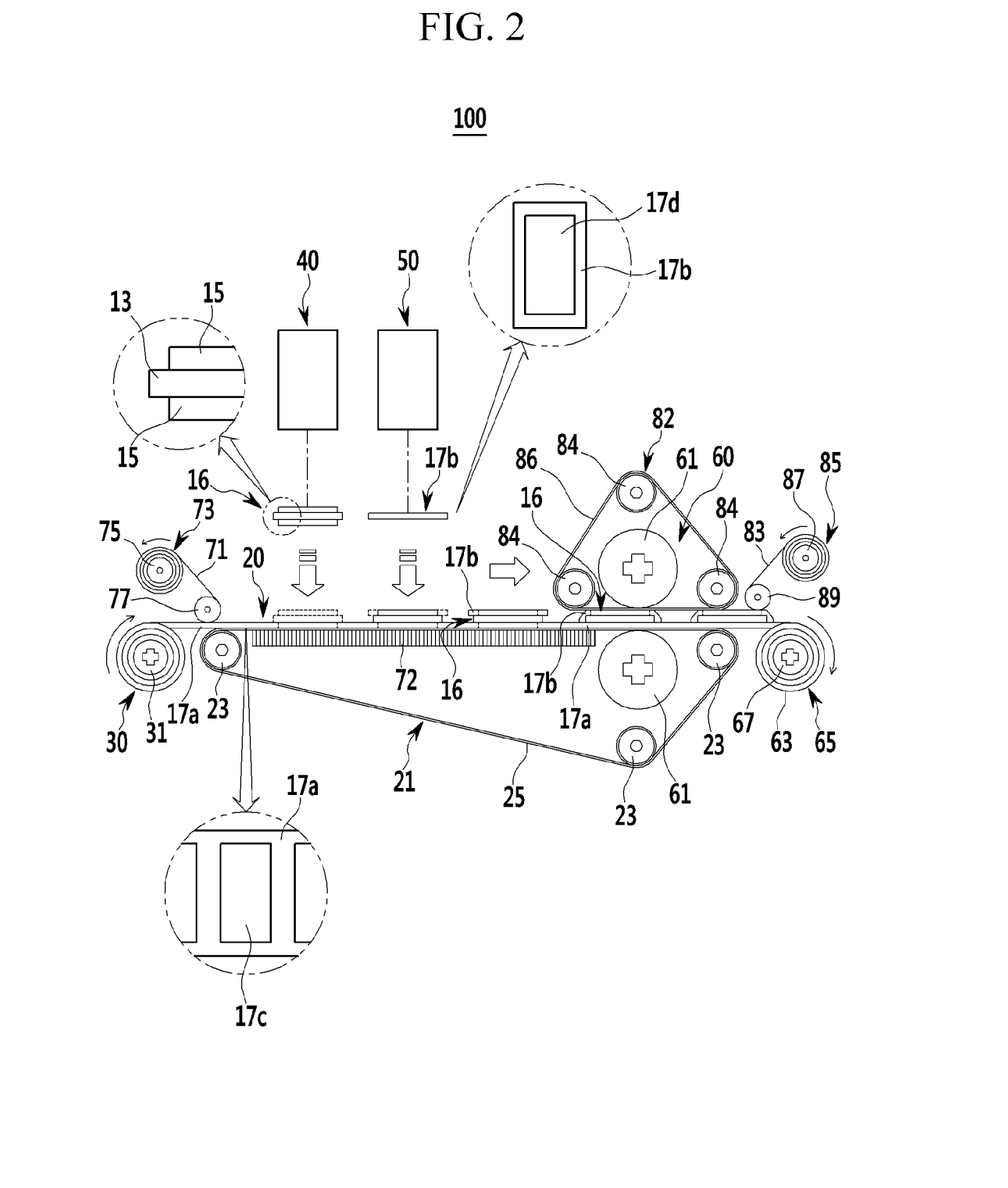
FIG. 2 is a diagram schematically illustrating an apparatus for manufacturing a membrane-electrode assembly for a fuel cell according to an exemplary embodiment of the present invention.

FIG. 2 is a diagram schematically illustrating an apparatus for manufacturing a membrane-electrode assembly for a fuel cell according to an exemplary embodiment of the present invention. Referring to FIG. 2, the apparatus 100 for manufacturing a membrane-electrode assembly for a fuel cell according to an exemplary embodiment of the present invention may be applied to an automation system for automatically and consecutively manufacturing the parts of unit fuel cells that form a fuel cell stack. For example, the apparatus 100 for manufacturing a membrane-electrode assembly for a fuel cell according to an exemplary embodiment of the present invention may be used to manufacture a membrane-electrode assembly 10, that is, a core part of a fuel cell, in which electrode catalyst layers 15 may be formed on both faces of an electrolyte membrane 13 and sub-gaskets 17 may be formed on the edge sides of the electrode catalyst layers 15 (refer to FIG. 6).

In particular, hydrogen ions move through the electrolyte membrane 13 and the sub-gaskets 17 function to protect the electrode catalyst layers 15 and the electrolyte membrane 13 and to secure the assembly of fuel cells. The apparatus 100 for manufacturing a membrane-electrode assembly for a fuel cell according to an exemplary embodiment of the present invention may be configured to manufacture the membrane-electrode assembly 10 using a mixed flow method of a roll-to-roll method and a sheet loading method to minimize the materials of the electrolyte membrane 13 disposed between the sub-gaskets 17, that is, portions in which electricity is not generated.

In other words, an exemplary embodiment of the present invention provides the apparatus 100 for manufacturing the membrane-electrode assembly, which may be capable of reducing the materials of the electrolyte membrane 13 since the electrolyte membrane 13 is not present in the entire region between the sub-gaskets 17, that is, portions in which electricity is not generated. Accordingly, the apparatus 100 for manufacturing a membrane-electrode assembly for a fuel cell according to an exemplary embodiment of the present invention may include a sub-gasket feeding unit 30, an electrode membrane loading unit 40, a sub-gasket loading unit 50, and an MEA bonding unit 60.

Constituent elements to be described below may be formed in a single frame or two or more partitioned frames (not illustrated). The frame may include a variety of types of attached elements, such as brackets, bars, rods, plate, housings, cases, blocks, barrier ribs, ribs, rails, and collars for supporting the constituent elements. In an exemplary embodiment of the present invention, the sub-gasket feeding unit 30 may be configured to unwind a first sub-gasket sheet 17a wound in a roll form and supply the first sub-gasket sheet 17a to a transfer line 20. In other words, the sub-gasket feeding unit 30 may be configured to supply the first sub-gasket sheet 17a to the transfer line 20 using a roll-to-roll method.

Particularly, the transfer line 20 may be configured to transfer various parts for manufacturing the membrane-electrode assembly 10, and may include a main conveyor 21 installed in a frame (not illustrated). The main conveyor 21 may include a conveyor belt 25 that travels on a continuous track through conveyor rollers 23. The main conveyor 21 is a typical conveyor apparatus that is widely known in the industry, and thus a detailed description of the construction thereof is omitted in this specification.

The sub-gasket feeding unit 30 may be installed in the frame on the entry side of the transfer line 20. In addition, the sub-gasket feeding unit 30 may include a sub-gasket roller 31 configured to unroll the first sub-gasket sheet 17a wound in a roll form and supply the unrolled first sub-gasket sheet 17a to the transfer line 20. In particular, first electrode windows 17c for opening an electrode membrane sheet 16 may be consecutively formed in the first sub-gasket sheet 17a to be spaced apart from each other at specific intervals. The first electrode windows 17c may be formed in the first sub-gasket sheet 17a in a separate cutting process.

Furthermore, manifold windows (not illustrated) that correspond to an inlet manifold and exit manifold (e.g., output manifold) of a separator may also be formed in the first sub-gasket sheet 17a. In an exemplary embodiment of the present invention, a film rewinder 73 configured to recover a first protection film 71 (also commonly called a "hetero film") attached to the first sub-gasket sheet 17a and winding the first protection film 71 may be installed on a part of the sub-gasket feeding unit 30. The film rewinder 73 may include a first rewinding roller 75 configured to wind the first protection film 71 in a roll form and a first guide roller 77 configured to guide the first protection film 71 peeled off from the first sub-gasket sheet 17a to the first rewinding roller 75.

In another exemplary embodiment of the present invention, a vacuum suction unit 72 configured to suction the first sub-gasket sheet 17a in a vacuum may be installed in the transfer line 20. The vacuum suction unit 72 may be configured to suction the first sub-gasket sheet 17a toward the conveyor belt 25 of the main conveyor 21 using vacuum pressure. In particular, a plurality of suction apertures through which air may be suctioned may be formed in the vacuum suction unit 72 to suction the first sub-gasket sheet 17a in a vacuum. A plurality of connection apertures connected to the suctioning apertures of the vacuum suction unit 72 may be formed in the conveyor belt 25.

In an exemplary embodiment of the present invention, the electrode membrane loading unit 40 may form the electrode catalyst layers 15 on both faces (i.e., top and bottom surfaces in FIG. 6) of the electrolyte membrane 13, collect (e.g., pick up, grab, etc.) the electrode membrane sheet 16 cut in a unit form, and load the electrode membrane sheets 16 onto the first electrode windows 17c of the first sub-gasket sheet 17a. The electrode membrane sheet 16 may be formed by cutting the electrolyte membrane sheet 16 between the electrode catalyst layers 15 when the electrode catalyst layers 15 are consecutively formed on both faces of the electrolyte membrane sheet 16 to be spaced apart from each other at specific intervals (e.g., at a pitch of about 50 mm) while the electrolyte membrane sheet wound in a roll form is unrolled.

Figure 3:
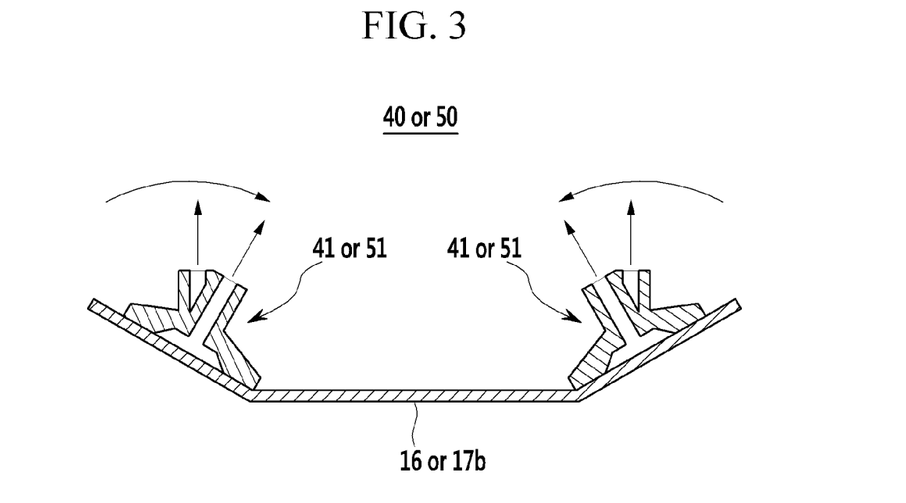
FIG. 3 is a diagram schematically illustrating an electrode membrane loading unit and a sub-gasket loading unit applied to the apparatus for manufacturing a membrane-electrode assembly for a fuel cell according to an exemplary embodiment of the present invention.

In particular, the electrolyte membrane sheet 16 may be cut with a margin of a particular pitch on the exterior of the edges of the electrode catalyst layers 15. In other words, the electrode membrane sheet 16 may include the electrolyte membrane 13 having a margin of a particular pitch on the exterior of the edges of the electrode catalyst layers 15. The electrode membrane loading unit 40 may be installed over the transfer line 20, may collect the electrode membrane sheet 16, and may load the electrode membrane sheets 16 onto the first electrode windows 17c of the first sub-gasket sheet 17a. Accordingly, the electrode membrane loading unit 40 may include a robot gripper. As illustrated in FIGS. 2 and 3, the electrode membrane loading unit 40 may include a pair of first grippers 41 configured to suction the electrode membrane sheet 16 in a vacuum. The pair of first grippers 41 may be configured to suction both ends of the electrode membrane sheet 16 in a vacuum.

To apply tension to the electrode membrane sheet 16, the pair of first grippers 41 may be installed to upwardly tilt both ends of the electrode membrane sheet 16 in opposite directions when both ends of the electrode membrane sheet 16 are suctioned in a vacuum. In other words, the pair of first grippers 41 may be configured to load the electrode membrane sheets 16 onto the first electrode windows 17c of the first sub-gasket sheet 17a when both ends of the electrode membrane sheet 16 suctioned in a vacuum are bent at a particular angle and tension is applied to the electrode membrane sheet 16. The particular angle may be 10 degree or less. It is notable that a specific angle may be decided for a preferable tension considering materials of the electrode membrane sheet 16. The tilting of the first grippers 41 may be performed using a known actuation cylinder (not illustrated). Furthermore, the electrode membrane sheet 16 may be loaded onto the first electrode window 17c of the first sub-gasket sheet 17a by the first grippers 41 and may be suctioned to the conveyor belt 25 of the main conveyor 21 in a vacuum by the vacuum suction unit 72.

Referring to FIG. 2, in an exemplary embodiment of the present invention, the sub-gasket loading unit 50 may form a second electrode window 17d, to collect the second sub-gasket sheet 17b cut in a unit form, and to load the second sub-gasket sheet 17b onto the electrode membrane sheet 16. The second sub-gasket sheet 17b may be formed to unroll a gasket sheet wound in a roll form and to cut the gasket sheet between second electrode windows 17d when the second electrode windows 17d is formed in the gasket sheet to be spaced apart from each other at specific intervals.

The second electrode window 17d of the second sub-gasket sheet 17b opens the electrode membrane sheet. A manifold window may be formed in the second sub-gasket sheet 17b in addition to the second electrode window 17d. The sub-gasket loading unit 50 may be installed over the transfer line 20, may collect the second sub-gasket sheet 17b, and may load the second sub-gasket sheet 17b onto the electrode membrane sheet 16. Accordingly, the sub-gasket loading unit 50 may include a robot gripper. As illustrated in FIGS. 2 and 3, the sub-gasket loading unit 50 may include a pair of second grippers 51 configured to suction the second sub-gasket sheet 17b in a vacuum. The pair of second grippers 51 may be configured to suction both ends of the second sub-gasket sheet 17b in a vacuum.

To apply tension to the second sub-gasket sheet 17b, the pair of second grippers 51 may be installed to upwardly tilt both ends of the second sub-gasket sheet 17b in opposite directions when both ends of the second sub-gasket sheet 17b are suctioned in a vacuum. In other words, the pair of second grippers 51 may bend both ends of the second sub-gasket sheet 17b suctioned in a vacuum at a particular angle, may apply tension to the second sub-gasket sheet 17b, and may load the second sub-gasket sheet 17b onto the electrode membrane sheet 16. The tilting of the second grippers 51 may be performed using a known actuation cylinder (not illustrated).

Figure 4:
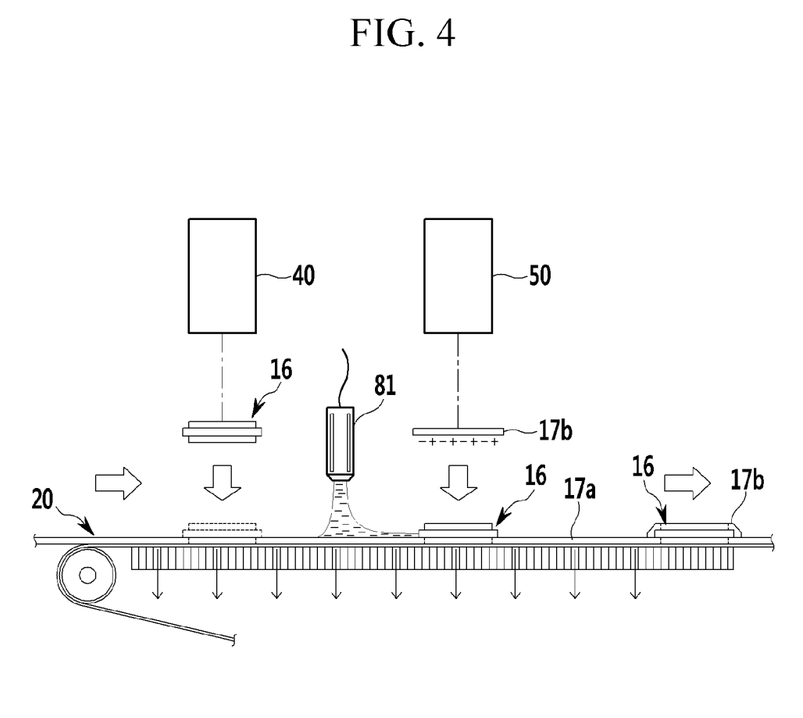
FIG. 4 is a diagram schematically illustrating an electrostatic generator applied to the apparatus for manufacturing a membrane-electrode assembly for a fuel cell according to an exemplary embodiment of the present invention.

In an exemplary embodiment of the present invention, as illustrated in FIG. 4, the apparatus 100 may include an electrostatic generator 81 configured to attach (e.g., connect) the second sub-gasket sheet 17b, loaded onto the electrode membrane sheet 16 through the sub-gasket loading unit 50, to the first sub-gasket sheet 17a using static electricity. The electrostatic generator 81 may be installed over the transfer line 20 and may be configured to generate static electricity in the first sub-gasket sheet 17a. The electrostatic generator 81 includes a known electrostatic generator for forming a specific voltage with electrostatic generation potential, and thus a detailed description of the construction thereof is omitted in this specification.

In an exemplary embodiment of the present invention, the second sub-gasket sheet 17b may be loaded onto the electrode membrane sheet 16 using the sub-gasket loading unit 50 when static electricity is generated in the first sub-gasket sheet 17a by the electrostatic generator 81. Accordingly, in an exemplary embodiment of the present invention, the second sub-gasket sheet 17b may be attached to the first sub-gasket sheet 17a using static electricity generated in the first sub-gasket sheet 17a, and the home position (e.g., an original position) of the second sub-gasket sheet 17b with respect to the electrode membrane sheet 16 may be maintained.

Referring to FIG. 2, in an exemplary embodiment of the present invention, the MEA bonding unit 60 may bond the first sub-gasket sheet 17a, the electrode membrane sheet 16, and the second sub-gasket sheet 17b mutually stacked together on the transfer line 20 using a thermal compression method. The MEA bonding unit 60 may include a pair of hot rollers 61 rotatably installed on the upper and lower sides of the transfer line 20. The hot rollers 61 may be installed on the side opposite the entry side of the transfer line 20, and each hot roller 61 includes a known heat source, such as a heat line or heating lamp for generating heat.

The MEA bonding unit 60 may integrate and bond the first sub-gasket sheet 17a, the electrode membrane sheet 16, and the second sub-gasket sheet 17b sequentially stacked over the transfer line 20 while passing the first sub-gasket sheet 17a, the electrode membrane sheet 16, and the second sub-gasket sheet 17b between the pair of hot rollers 61 along the transfer line 20. In other words, the MEA bonding unit 60 may be configured to pass the first sub-gasket sheet 17a, the electrode membrane sheet 16, and the second sub-gasket sheet 17b mutually stacked through the pair of hot rollers 61, thus being capable of forming an MEA sheet 63 in which the first sub-gasket sheet 17a, the electrode membrane sheet 16, and the second sub-gasket sheet 17b may be integrated and bonded together.

In an exemplary embodiment of the present invention, an MEA rewinder 65 configured to wind the MEA sheet 63 in which the electrode membrane sheet 16 and the second sub-gasket sheet 17b are attached to the first sub-gasket sheet 17a by the MEA bonding unit 60 may be installed in the rear of the MEA bonding unit 60. Particularly, the MEA rewinder 65 may be installed in the extension line of the transfer line 20 extraneous to the transfer line 20. The MEA rewinder 65 may include a second rewinding roller 67 configured to wind the MEA sheet 63 in a roll form.

In another exemplary embodiment of the present invention, a film unwinder 85 configured to unroll a second protection film 83 of a roll form and supply the second protection film 83 to the MEA sheet 63 may be installed over the MEA rewinder 65. In other words, the film unwinder 85 may be configured to attach (e.g., connect) the second protection film 83 to the MEA sheet 63. The film unwinder 85 may include an unwinding roller 87 configured to unroll the second protection film 83 previously wound in a roll form and a second guide roller 89 configured to guide and pressurize the second protection film 83 onto the MEA sheet 63.

Reference numeral 82 denotes a sub-conveyor installed over the transfer line 20 in accordance with the main conveyor 21. The sub-conveyor 82 may be configured to transfer the first sub-gasket sheet 17a, the electrode membrane sheet 16, and the second sub-gasket sheet 17b mutually stacked between the pair of hot rollers 61 and transfer the MEA sheet 63, passing through the hot rollers 61, to the MEA rewinder 65. The sub-conveyor 82 may include conveyor rollers 84 and a conveyor belt 86 similar to the main conveyor 21.

Figure 5:
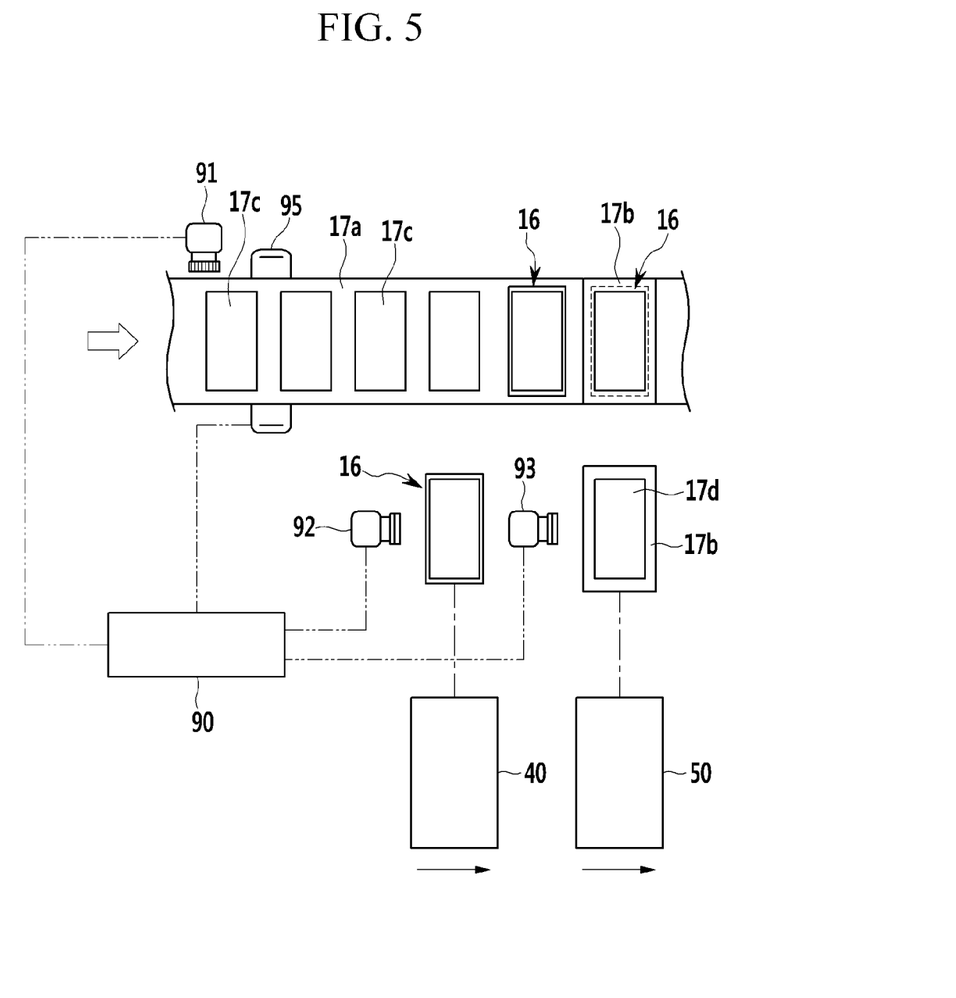
FIG. 5 is a diagram schematically illustrating location sensors applied to the apparatus for manufacturing a membrane-electrode assembly for a fuel cell according to an exemplary embodiment of the present invention.

In another exemplary embodiment of the present invention, as illustrated in FIG. 5, the apparatus 100 may include first, second, and third location sensors 91, 92, and 93 to more accurately load the electrode membrane sheet 16 onto the first electrode window 17c of the first sub-gasket sheet 17a and more accurately load the second sub-gasket sheet 17b onto the electrode membrane sheet 16. The first, second, and third location sensors 91, 92, and 93 may be installed extraneous to the transfer line 20 (refer to FIG. 2).

The first location sensor 91 may be configured to detect an edge location of the first electrode window 17c with respect to the first sub-gasket sheet 17a fed to the transfer line 20 through the sub-gasket feeding unit 30 (refer to FIG. 2) and output a corresponding detection signal to a controller 90. The second location sensor 92 may be configured to detect an edge location of the electrode membrane sheet 16 loaded onto the first electrode window 17c of the first sub-gasket sheet 17a through the electrode membrane loading unit 40 and output a corresponding detection signal to the controller 90.

Furthermore, the third location sensor 93 may be configured to detect an edge location of the second electrode window 17d with respect to the second sub-gasket sheet 17b loaded onto the electrode membrane sheet 16 through the sub-gasket loading unit 50 and output a corresponding detection signal to the controller 90. The first, second, and third location sensors 91, 92, and 93 are widely known in the art to which the present invention pertains, and a detailed description of the construction thereof is omitted in this specification.

Additionally, the controller 90 may be configured to execute an overall operation of the apparatus 100. For example, the controller 90 may be configured to adjust the loading home position of the electrode membrane sheet 16 based on the measured value of the edge location of the electrode membrane sheet 16, detected by the second location sensor 92, based on the measured value of the edge location of the first electrode windows 17c of the first sub-gasket sheet 17a detected by the first location sensor 91. In addition, the controller 90 may be configured to adjust the loading home position of the second sub-gasket sheet 17b based on the measured value of the edge location of the second electrode window 17d of the second sub-gasket sheet 17b, detected by the third location sensor 93, based on the measured value of the edge location of the first electrode windows 17c detected by the first location sensor 91.

When an encoder 95 determines that the first electrode window 17c of the first sub-gasket sheet 17a has reached a predetermined task location, the controller 90 may be configured to output a control signal to the electrode membrane loading unit 40. In response to receiving the control signal, the electrode membrane loading unit 40 may be configured to trace along the transfer line 20 and load the electrode membrane sheets 16 onto the first electrode windows 17c of the first sub-gasket sheet 17a. When the encoder 95 determines that the electrode membrane sheet 16 has reached a predetermined task location and the loading of the electrode membrane sheet 16 has been completed, the controller 90 may be configured to output a control signal to the sub-gasket loading unit 50. In response to receiving the control signal, the sub-gasket loading unit 50 may be configured to track along the transfer line 20 and load the second sub-gasket sheet 17b onto the electrode membrane sheet 16.

Hereinafter, a method of manufacturing the membrane-electrode assembly using the apparatus for manufacturing a membrane-electrode assembly for a fuel cell according to an exemplary embodiment of the present invention is described in detail with reference to the aforementioned drawings.

First, the first sub-gasket sheet 17a wound in a roll form on the sub-gasket roller 31 of the sub-gasket feeding unit 30 may be unrolled and fed to the transfer line 20. The first electrode windows 17c for opening the electrode membrane sheet 16 may be formed consecutively in the first sub-gasket sheet 17a to be spaced apart from each other at specific intervals.

In particular, the first sub-gasket sheet 17a may be supplied to the transfer line 20 and transferred along the transfer line 20 when the first sub-gasket sheet 17a is suctioned on a surface of the conveyor belt 25 of the main conveyor 21 in a vacuum by the vacuum suction unit 72. The first rewinding roller 75 of the film rewinder 73 may be configured to wind the first protection film 71, attached to the first sub-gasket sheet 17a, in a roll form while peeling off the first protection film 71. The first guide roller 77 of the film rewinder 73 may be configured to guide the first protection film 71, peeled off from the first sub-gasket sheet 17a, to the first rewinding roller 75.

Furthermore, the electrode membrane loading unit 40 may form the electrode catalyst layers 15 on both faces of the electrolyte membrane 13 and may be configured to collect both ends of the electrode membrane sheet 16, cut in a unit form, using the first grippers 41 by suctioning the electrode membrane sheet 16 in a vacuum. Furthermore, the sub-gasket loading unit 50 may form the second electrode window 17d and may be configured to collect both ends of the second sub-gasket sheet 17b, cut in a unit form, using the second grippers 51 by suctioning the second sub-gasket sheet 17b in a vacuum. In particular, the first grippers 41 of the electrode membrane loading unit 40 may have both bent ends of the electrode membrane sheet 16 suctioned in a vacuum at a particular angle and may be configured to apply tension to the electrode membrane sheet 16.

Additionally, the second grippers 51 of the sub-gasket loading unit 50 may bend both ends of the second sub-gasket sheet 17b suctioned in a vacuum at a particular angle and may be configured to apply tension to the second sub-gasket sheet 17b. In this state, the first location sensor 91 may be configured to detect an edge location of the first electrode windows 17c with respect to the first sub-gasket sheet 17a and output a corresponding detection signal to the controller 90. The second location sensor 92 may be configured to detect an edge location of the electrode membrane sheet 16 regulated using the electrode membrane loading unit 40 and output a corresponding detection signal to the controller 90. In addition, the third location sensor 93 may be configured to detect an edge location of the second electrode window 17d with respect to the second sub-gasket sheet 17b regulated using the sub-gasket loading unit 50 and output a corresponding detection signal to the controller 90.

The controller 90 may then be configured to adjust the loading home position (e.g., an original start position) of the electrode membrane sheet 16 based on the measured value of the edge location of the electrode membrane sheet 16, detected by the second location sensor 92, based on the measured value of the edge location of the first electrode windows 17c of the first sub-gasket sheet 17a that is detected by the first location sensor 91. The controller 90 may also be configured to adjust the loading home position of the second sub-gasket sheet 17b based on the measured value of the edge location of the second electrode window 17d of the second sub-gasket sheet 17b, detected by the third location sensor 93, based on the measured value of the edge location of the first electrode windows 17c detected by the first location sensor 91.

Accordingly, when the encoder 95 determines that the first electrode window 17c of the first sub-gasket sheet 17a has reached a predetermined task location, the controller 90 may be configured to output a control signal to the electrode membrane loading unit 40. In response to receiving the control signal, the electrode membrane loading unit 40 may be configured to trace along the transfer line 20 and load the electrode membrane sheet 16 onto the first electrode window 17c of the first sub-gasket sheet 17a. In particular, when the electrode membrane loading unit 40 loads the electrode membrane sheet 16 onto the first electrode window 17c of the first sub-gasket sheet 17a, the vacuum suction unit 72 may be configured to suction the electrode membrane sheet 16 to the conveyor belt 25 of the main conveyor 21 in a vacuum.

Thereafter, when the encoder 95 determines that the electrode membrane sheet 16 has reached a predetermined task location and the loading of the electrode membrane sheet 16 is completed, the controller 90 may be configured to output a control signal to the sub-gasket loading unit 50. In response to receiving the control signal, the sub-gasket loading unit 50 may be configured to trace along the transfer line 20 and load the second sub-gasket sheet 17b onto the electrode membrane sheet 16.

In this process, the electrostatic generator 81 may be configured to generate static electricity in the first sub-gasket sheet 17a. In an exemplary embodiment of the present invention, the second sub-gasket sheet 17b may be attached to the first sub-gasket sheet 17a by the static electricity generated by the first sub-gasket sheet 17a, to maintain the home position of the second sub-gasket sheet 17b with respect to the electrode membrane sheet 16.

In an exemplary embodiment of the present invention, when the first sub-gasket sheet 17a, the electrode membrane sheet 16, and the second sub-gasket sheet 17b are sequentially stacked over the transfer line 20 as described above, the first sub-gasket sheet 17a, the electrode membrane sheet 16, and the second sub-gasket sheet 17b may be forced to pass through the hot rollers 61 of the MEA bonding unit 60 along the transfer line 20.

Thus, the first sub-gasket sheet 17a, the electrode membrane sheet 16, and the second sub-gasket sheet 17b mutually stacked may enter the pair of hot rollers 61 between the main conveyor 21 of the transfer line 20 and the sub-conveyor 82 corresponding to the main conveyor 21. Accordingly, the first sub-gasket sheet 17a, the electrode membrane sheet 16, and the second sub-gasket sheet 17b mutually stacked may be forced (e.g., pushed) to pass through the pair of hot rollers 61, to thus form the MEA sheet 63 in which the first sub-gasket sheet 17a, the electrode membrane sheet 16, and the second sub-gasket sheet 17b are integrated and bonded together. The MEA sheet 63 may then be transferred to the MEA rewinder 65 by the main conveyor 21 and the sub-conveyor 82. The second rewinding roller 67 of the MEA rewinder 65 may be configured to wind the MEA sheet 63 in a roll form.

In an exemplary embodiment of the present invention, in the process of winding the MEA sheet 63 in a roll form using the second rewinding roller 67 of the MEA rewinder 65 as described above, the second protection film 83 wound in a roll form may be unrolled to the unwinding roller 87 of the film unwinder 85. Furthermore, the second guide roller 89 of the film unwinder 85 may be configured to guide the second protection film 83 to the MEA sheet 63 and pressurize the second protection film 83 onto the MEA sheet 63, thus attaching the second protection film 83 to the MEA sheet 63.

Figure 6:
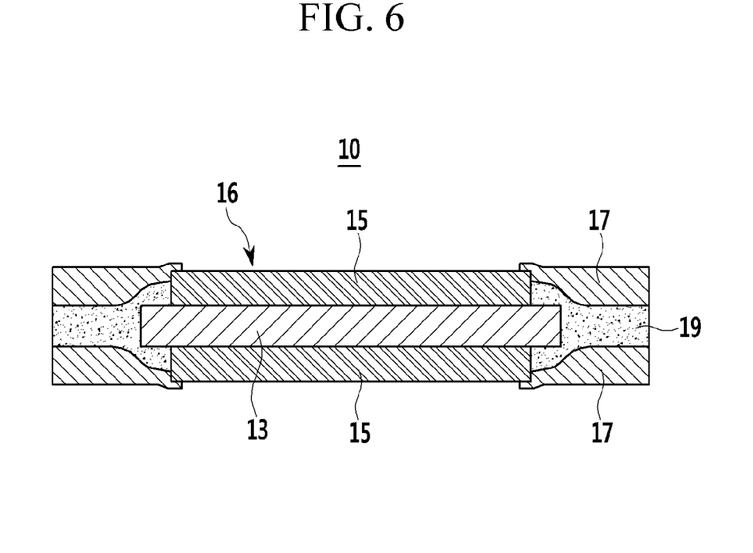
FIG. 6 is a cross-sectional view schematically illustrating a membrane-electrode assembly manufactured by the apparatus for manufacturing a membrane-electrode assembly for a fuel cell according to an exemplary embodiment of the present invention.

Accordingly, when the MEA sheet 63 has been manufactured using the process as described above and the MEA sheet 63 wound in a roll form is unrolled and cut in the form of a unit including the electrode catalyst layers 15 by a separate cutting process, the membrane-electrode assembly 10 for a fuel cell according to an exemplary embodiment of the present invention, such as that illustrated in FIG. 6, may be manufactured.

FIG. 6 is a cross-sectional view schematically illustrating the membrane-electrode assembly manufactured by the apparatus for manufacturing a membrane-electrode assembly for a fuel cell according to an exemplary embodiment of the present invention. Referring to FIG. 6, the membrane-electrode assembly 10 manufactured by the apparatus 100 for manufacturing a membrane-electrode assembly for a fuel cell according to an exemplary embodiment of the present invention may include the electrode catalyst layers 15 formed on both faces of the electrolyte membrane 13 and the sub-gaskets 17 respectively formed on the edge sides of the electrode catalyst layers 15. In particular, the sub-gaskets 17 may be bonded to the electrode membrane sheet 16 with the electrode membrane sheet 16 interposed therebetween on the upper and lower sides of FIG. 6, and may fix the electrolyte membrane 13 and the electrode catalyst layers 15 of the electrode membrane sheet 16.

In an exemplary embodiment of the present invention, the electrode membrane sheet 16 may include the electrolyte membrane 13 extraneous to the edges of the electrode catalyst layers 15 with a margin of a particular pitch. An end that corresponds to the marginal portion of the electrolyte membrane 13 may protrude (e.g., extend) into a partial region between the sub-gaskets 17. In other words, the end of the electrolyte membrane 13 may protrude into a partial region of the entire region between the sub-gaskets 17 and is the partial region (e.g., a first region) may be about 33% of the entire region (e.g., a second region).

For example, compared a conventional electrolyte membrane which has an area of 0.07-0.09 $m^2$, the electrolyte membrane 13 according to an exemplary embodiment of the present invention may have an area of about 0.04-0.06 $m^2$. Furthermore, a bonding unit 19 configured to fix and support the electrolyte membrane 13 and the electrode catalyst layers 15 may be formed in the remaining region of the entire region between the sub-gaskets 17 and excluded from the partial region.

In accordance with the aforementioned apparatus 100 for manufacturing a membrane-electrode assembly for a fuel cell according to an exemplary embodiment of the present invention, the membrane-electrode assembly 10 may be manufactured using a mixed flow method of a roll-to-roll method and a sheet loading method by the sub-gasket feeding unit 30, the electrode membrane loading unit 40, and the sub-gasket loading unit 50.

Accordingly, in an exemplary embodiment of the present invention, a minimum electrolyte membrane 13 may protrude between the sub-gaskets 17, and the membrane-electrode assembly 10 bonded to the sub-gaskets 17 along with the electrode catalyst layers 15 may be manufactured. Thus, the electrolyte membrane 13 present between the sub-gaskets 17, that is, portions in which electricity is not generated in the membrane-electrode assembly 10, may be minimized. Accordingly, in an exemplary embodiment of the present invention, the manufacturing costs of the membrane-electrode assembly 10 may be reduced since less of the materials of a relatively expensive electrolyte membrane are used.

Figure 7:
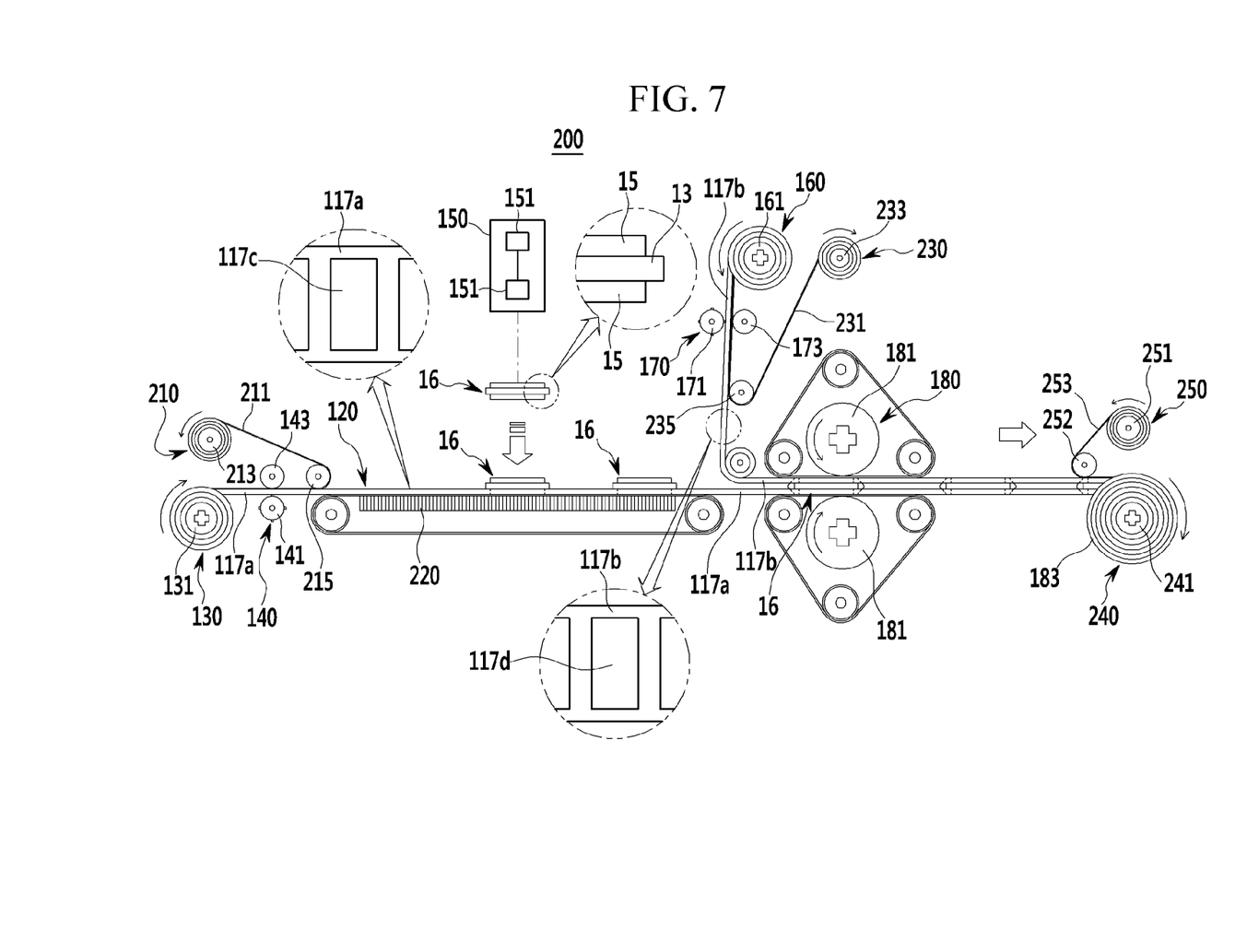
FIG. 7 is a diagram schematically illustrating an apparatus for manufacturing a membrane-electrode assembly for a fuel cell according to another exemplary embodiment of the present invention.

FIG. 7 is a diagram schematically illustrating an apparatus for manufacturing a membrane-electrode assembly for a fuel cell according to another exemplary embodiment of the present invention. Referring to FIG. 7, the apparatus 200 for manufacturing a membrane-electrode assembly for a fuel cell according to another exemplary embodiment of the present invention basically manufactures the membrane-electrode assembly using a mixed flow method of a roll-to-roll method and a sheet loading method, and may include a first sub-gasket feeding unit 130, a first cutting unit 140, an electrode membrane loading unit 150, a second sub-gasket feeding unit 160, a second cutting unit 170, and an MEA bonding unit 180.

In an exemplary embodiment of the present invention, the first sub-gasket feeding unit 130 may be configured to unroll a first sub-gasket sheet 117a wound in a roll form and supply the first sub-gasket sheet 117a to a transfer line 120. The first sub-gasket sheet 117a is a sheet before it is processed. The first sub-gasket feeding unit 130 may be installed on the entry side of the transfer line 120, and may include a first sub-gasket roller 131 configured to unroll the first sub-gasket sheet 117a wound in a roll form and supply the first sub-gasket sheet 117a to the transfer line 120.

The first cutting unit 140 may consecutively form first electrode windows 117c in the first sub-gasket sheet 117a, fed by the first sub-gasket feeding unit 130, to space the first electrode windows 117c apart from each other at particular intervals. The first cutting unit 140 may form manifold windows (not illustrated), that correspond to the inlet manifold and exit manifold (e.g., output manifold) of a separator, in the first sub-gasket sheet 117a.

Further, the first cutting unit 140 may be installed on a part of the first sub-gasket feeding unit 130, and may include a first cutting roller 141 and a first support roller 143 disposed on the upper and lower sides of the transfer path of the first sub-gasket sheet 117a. The first cutting roller 141 may include a cutter configured to consecutively form the first electrode windows 117c in the first sub-gasket sheet 117a to space the first electrode windows 117c apart from each other at particular intervals. The first support roller 143 may support the first sub-gasket sheet 117a and the first cutting roller 141.

In addition, the apparatus 200 may further include a first film rewinder 210 configured to recover a first protection film 211 attached to the first sub-gasket sheet 117a and wind the first protection film 211 in a roll form. The first film rewinder 210 may be installed in the rear of the first cutting unit 140 on a part of the first sub-gasket feeding unit 130. The first film rewinder 210 may include a first rewinding roller 213 configured to wind the first protection film 211 in a roll form and a first guide roller 215 configured to guide the first protection film 211, peeled off from the first sub-gasket sheet 117a, to the first rewinding roller 213. Furthermore, a vacuum suction unit 220 configured to suction the first sub-gasket sheet 117a in a vacuum may be installed in the transfer line 120. The vacuum suction unit 220 has the same construction as that of the aforementioned exemplary embodiment, and thus a detailed description thereof is omitted.

In an exemplary embodiment of the present invention, the electrode membrane loading unit 150 may form the electrode catalyst layers 15 on both faces (i.e., top and bottom surfaces in FIG. 7) of the electrolyte membrane 13, may be configured to collect the electrode membrane sheet 16 cut in a unit form, and load the electrode membrane sheets 16 onto the first electrode windows 117c of the first sub-gasket sheet 117a.

The electrode membrane loading unit 150 may include a robot gripper installed over the transfer line 120, and may include a pair of grippers 151 configured to suction the electrode membrane sheet 16 in a vacuum. In particular, to apply tension to the electrode membrane sheet 16, the pair of grippers 151 may be installed to upwardly tilt both ends of the electrode membrane sheet 16 in opposite directions when both ends of the electrode membrane sheet 16 are suctioned in a vacuum. The electrode membrane loading unit 150 has the same construction as that of the aforementioned exemplary embodiment, and thus a detailed description thereof is omitted.

Moreover, the second sub-gasket feeding unit 160 may be configured to unroll the second sub-gasket sheet 117b wound in a roll form and supply the second sub-gasket sheet 117b to the electrode membrane sheet 16. In particular, the second sub-gasket sheet 117b is a sheet before it is processed. The second sub-gasket feeding unit 160 may include a second sub-gasket roller 161 installed extraneous to the transfer line 120 and configured to unroll the second sub-gasket sheet 117b wound in a roll form.

In addition, the second cutting unit 170 may consecutively form second electrode windows 117d in a second sub-gasket sheet 117b, fed by the second sub-gasket feeding unit 160, to space the second electrode windows 117d apart from each other at particular intervals. Furthermore, the second cutting unit 170 may form manifold windows (not illustrated), that correspond to the inlet manifold and exit manifold of a separator, in the second sub-gasket sheet 117b.

The second cutting unit 170 may be installed on a part of the second sub-gasket feeding unit 160, and may include a second cutting roller 171 and a second support roller 173 disposed on both sides of the transfer path of the second sub-gasket sheet 117b. The second cutting roller 171 may include a cutter configured to consecutively form the second electrode windows 117d in the second sub-gasket sheet 117b to space the second electrode windows 117d apart from each other at particular intervals. The second support roller 173 may support the second sub-gasket sheet 117b and the second cutting roller 171.

In an exemplary embodiment of the present invention, the apparatus 200 may further include a second film rewinder 230 configured to recover a second protection film 231 attached to the second sub-gasket sheet 117b and wind the second protection film 231 in a roll form. The second film rewinder 230 may be installed in the rear of the second cutting unit 170 on a part of the second sub-gasket feeding unit 160. The second film rewinder 230 may include a second rewinding roller 233 configured to wind the second protection film 231 in a roll form and a second guide roller 235 configured to guide the second protection film 231, peeled off from the second sub-gasket sheet 117b, to the second rewinding roller 233.

In an exemplary embodiment of the present invention, the MEA bonding unit 180 may be configured to bond the first sub-gasket sheet 117a, the electrode membrane sheet 16, and the second sub-gasket sheet 117b mutually stacked together using a thermal compression method while passing them through a pair of hot rollers 181. The MEA bonding unit 180 may be installed in the extension line of the transfer line 120 extraneous to the transfer line 120. The MEA bonding unit 180 may also pass the first sub-gasket sheet 117a, the electrode membrane sheet 16, and the second sub-gasket sheet 117b mutually stacked between the pair of hot rollers 181, to form an MEA sheet 183.

Further, an MEA rewinder 240 may be installed in the rear of the MEA bonding unit 180, and may be configured to wind the MEA sheet 183 in which the electrode membrane sheet 16 and the second sub-gasket sheet 117b are bonded together to the first sub-gasket sheet 117a by the MEA bonding unit 180 as described above. The MEA rewinder 240 may also include a rewinding roller 241 configured to wind the MEA sheet 183 in a roll form.

In another exemplary embodiment of the present invention, a film unwinder 250 configured to unroll a third protection film 253 of a roll form and supply the third protection film 253 to the MEA sheet 183 may be installed on a part of the MEA rewinder 240. In other words, the film unwinder 250 may be configured to attach the third protection film 253 to the MEA sheet 183. The film unwinder 250 may include an unwinding roller 251 configured to unroll the third protection film 253 wound in a roll form and a third guide roller 252 configured to pressurize the third protection film 253 while guiding the third protection film 253 to the MEA sheet 183.

The apparatus 200 may further include a plurality of location sensors (not illustrated) for more accurately loading the electrode membrane sheet 16 onto the first electrode window 117c of the first sub-gasket sheet 117a and more accurately feeding the second sub-gasket sheet 117b to the electrode membrane sheet 16. The location sensors have the same constructions as those of the aforementioned exemplary embodiment, and thus a detailed description thereof is omitted in the present exemplary embodiment.

A method of manufacturing the membrane-electrode assembly using the apparatus for manufacturing a membrane-electrode assembly for a fuel cell according to another exemplary embodiment of the present invention is described in detail below with reference to the aforementioned drawings.

First, in an exemplary embodiment of the present invention, the first sub-gasket sheet 117a wound in a roll form on the first sub-gasket roller 131 of the first sub-gasket feeding unit 130 may be unrolled and fed to the transfer line 120. In this process, the first cutting unit 140 may be configured to consecutively form the first electrode windows 117c in the first sub-gasket sheet 117a using the first cutting roller 141 and the first support roller 143 to space the first electrode windows 117c apart from each other at particular intervals.

The first rewinding roller 213 of the first film rewinder 210 may be configured to wind the first protection film 211, attached to the first sub-gasket sheet 117a, in a roll form while peeling off the first protection film 211. The first guide roller 215 of the first film rewinder 210 may be configured to guide the first protection film 211, peeled off from the first sub-gasket sheet 117a, to the first rewinding roller 213. The first sub-gasket sheet 117a in which the first electrode windows 117c are formed by the cutting unit 140 may be transferred along the transfer line 120 as described above. In particular, the first sub-gasket sheet 117a may be transferred along the transfer line 120 when suctioned by the vacuum suction unit 72 in a vacuum.

Thereafter, the electrode membrane loading unit 150 may form the electrode catalyst layers 15 on both faces of the electrolyte membrane 13 and may be configured to collect both ends of the electrode membrane sheet 16, cut in a unit form, using the pair of grippers 151 in a vacuum suction manner. In particular, the pair of grippers 151 may be configured to hold both bent ends of the electrode membrane sheet 16, suctioned in a vacuum, at a particular angle, and apply tension to the electrode membrane sheet 16.

Thereafter, the electrode membrane loading unit 150 may be configured to trace along the transfer line 120 and load the electrode membrane sheet 16 onto the first electrode window 117c of the first sub-gasket sheet 117a. The electrode membrane sheet 16 may be loaded onto the first electrode window 117c of the first sub-gasket sheet 117a by the electrode membrane loading unit 150, and may be transferred along the transfer line 120 along with the first sub-gasket sheet 117a when the electrode membrane sheet 16 has been suctioned by the vacuum suction unit 220 in a vacuum.

When the electrode membrane sheet 16 has been loaded onto the first electrode windows 117c of the first sub-gasket sheet 117a as described above, the second sub-gasket sheet 117b wound on the second sub-gasket roller 161 of the second sub-gasket feeding unit 160 in a roll form may unrolled and fed to the electrode membrane sheet 16. In this process, the second cutting unit 170 may be configured to consecutively form the second electrode windows 117d in the second sub-gasket sheet 117b using the second cutting roller 171 and the second support roller 173 to space the second electrode windows 117d apart from each other at specific intervals.

Particularly, the second rewinding roller 233 of the second film rewinder 230 may be configured to wind the second protection film 231, attached to the second sub-gasket sheet 117b, in a roll form while peeling off the second protection film 231. The second guide roller 235 of the second film rewinder 230 may be configured to guide the second protection film 231, peeled off from the second sub-gasket sheet 117b, to the second rewinding roller 233. Thereafter, in an exemplary embodiment of the present invention, when the first sub-gasket sheet 117a, the electrode membrane sheet 16, and the second sub-gasket sheet 117b are sequentially stacked as described above, they may be forced to pass between the hot rollers 181 of the MEA bonding unit 180.

Accordingly, in an exemplary embodiment of the present invention, the MEA sheet 183 in which the first sub-gasket sheet 117a, the electrode membrane sheet 16, and the second sub-gasket sheet 117b are integrated and bonded together may be formed by passing the first sub-gasket sheet 117a, the electrode membrane sheet 16, and the second sub-gasket sheet 117b mutually stacked between the pair of hot rollers 181. The MEA sheet 183 may be transferred to the MEA rewinder 240 and the rewinding roller 241 of the MEA rewinder 240 may be configured to wind the MEA sheet 183 in a roll form.

In the process of winding the MEA sheet 183 through the rewinding roller 241 of the MEA rewinder 240 as described above, the third protection film 253 wound in a roll form may be unrolled and supplied to the unwinding roller 251 of the film unwinder 250. The third guide roller 253 of the MEA rewinder 240 may be configured to guide the third protection film 253 to the MEA sheet 183 and pressurize the third protection film 253 to the MEA sheet 183, thus attaching the third protection film 253 to the MEA sheet 183.

Accordingly, when the MEA sheet 183 is manufactured using a series of the aforementioned processes, when the MEA sheet 183 is unrolled and the MEA sheet 183 is cut in the form of a unit including the electrode catalyst layers 15, the membrane-electrode assembly 10 for a fuel cell, such as that in the aforementioned exemplary embodiment, can be may.

The remaining constructions and effects of the apparatus 200 for manufacturing a membrane-electrode assembly for a fuel cell according to the current exemplary embodiment of the present invention are the same as those of the aforementioned exemplary embodiment, and thus a detailed description thereof is omitted.

Although the exemplary embodiments of the present invention have been described above, the technical spirit of the present invention is not limited to the exemplary embodiments proposed in this specification. Those skilled in the art who understand the technical spirit of the present invention may easily propose other exemplary embodiments by supplementing, changing, deleting, and adding constituent elements within a range of the same technical spirit. However, those supplements, changes, deletions, and additions may be construed as falling within the range of the present invention.

DESCRIPTION OF SYMBOLS

10 . . . membrane-electrode assembly
13 . . . electrolyte membrane
15 . . . electrode catalyst layers
16 . . . electrode membrane sheet
17 . . . sub-gasket
17a . . . first sub-gasket sheet
17b . . . second sub-gasket sheet
17c . . . first electrode window
17d . . . second electrode window
20 . . . transfer line 21 . . . main conveyor
23, 84 . . . conveyor roller
25, 86 . . . conveyor belt
30 . . . sub-gasket feeding unit
31 . . . sub-gasket roller
40 . . . electrode membrane loading unit
41 . . . first gripper
50 . . . sub-gasket loading unit
51 . . . second gripper
60 . . . MEA bonding unit
61 . . . hot roller
63 . . . MEA sheet
65 . . . MEA rewinder
67 . . . second rewinding roller
71 . . . first protection film
72 . . . vacuum suction unit
73 . . . film rewinder
75 . . . first rewinding roller
77 . . . first guide roller
81 . . . electrostatic generator
82 . . . sub-conveyor
83 . . . second protection film
85 . . . film unwinder
87 . . . unwinding roller
89 . . . second guide roller
90 . . . controller
91 . . . first location sensor
92 . . . second location sensor
93 . . . third location sensor
95 . . . encoder

What is claimed is:

1. An apparatus for manufacturing a membrane-electrode assembly for a fuel cell, the apparatus comprising:
a sub-gasket feeding unit configured to consecutively form first electrode windows to space the first windows apart from each other at particular intervals, unroll a first sub-gasket sheet wound in a roll form, and supply the first sub-gasket sheet to a transfer line;
an electrode membrane loading unit installed over the transfer line and configured to form electrode catalyst layers on both faces of an electrolyte membrane, collect the electrode membrane sheet cut in a unit form, and load the electrode membrane sheets onto the first electrode windows of the first sub-gasket sheet;
a sub-gasket loading unit installed over the transfer line and configured to form second electrode windows, collect a second sub-gasket sheet cut in a unit form, and load the second sub-gasket sheets on the electrode membrane sheet;
membrane-electrode assembly (MEA) bonding units installed on upper and lower sides of the transfer line and configured to bond together the first sub-gasket sheet, the electrode membrane sheet, and the second sub-gasket sheet mutually stacked while passing the first sub-gasket sheet, the electrode membrane sheet, and the second sub-gasket sheet between a pair of hot rollers along the transfer line; and
an electrostatic generator installed over the transfer line and configured to generate static electricity in the first sub-gasket sheet to attach the second sub-gasket sheet loaded onto the electrode membrane sheet to the first sub-gasket sheet using the static electricity.

2. The apparatus of claim 1, further comprising:
an MEA rewinder installed in a rear of the MEA bonding units and configured to wind an MEA sheet to which the electrode membrane sheet and the second sub-gasket sheet are bonded on the first sub-gasket sheet by the MEA bonding units in a roll form.

3. The apparatus of claim 2, further comprising:
a film rewinder installed on a part of the sub-gasket feeding unit and configured to recover a protection film of the first sub-gasket sheet and wind the protection film in a roll form; and
a film unwinder installed on a part of the MEA rewinder and configured to unroll the protection film of a roll form and supply the unrolled protection film to the MEA sheet.

4. The apparatus of claim 1, further comprising:
a first location sensor, a second location sensor, and a third location sensor installed extraneous to the transfer line.

5. The apparatus of claim 4, wherein the first location sensor is configured to detect an edge location of the first electrode window of the first sub-gasket sheet, the second location sensor is configured to detect an edge location of the electrode membrane sheet, and the third location sensor is configured to detect an edge location of the second electrode window of the second sub-gasket sheet.

6. The apparatus of claim 1, further comprising:
a vacuum suction unit installed in the transfer line and configured to suction the first sub-gasket sheet and the electrode membrane sheet in a vacuum.

7. The apparatus of claim 1, wherein the electrode membrane loading unit includes a pair of first grippers configured to suction the electrode membrane sheet in a vacuum.

8. The apparatus of claim 7, wherein the pair of first grippers are installed to upwardly tilt both ends of the electrode membrane sheet in opposite directions and are configured to suction both ends of the electrode membrane sheet in a vacuum and apply tension to the electrode membrane sheet.

9. The apparatus of claim 7, wherein the sub-gasket loading unit includes a pair of second grippers configured to suction the second sub-gasket sheet in a vacuum.

10. The apparatus of claim 9, wherein the pair of second grippers are installed to upwardly tilt both ends of the second sub-gasket sheet in opposite directions and are configured to suction both ends of the second sub-gasket sheet in a vacuum and apply tension to the second sub-gasket sheet.

11. An apparatus for manufacturing a membrane-electrode assembly for a fuel cell, comprising:
a first sub-gasket feeding unit configured to unroll a first sub-gasket sheet wound in a roll form and supply the first sub-gasket sheet to a transfer line;
a first cutting unit installed on a part of the first sub-gasket feeding unit and configured to consecutively form first electrode windows in the first sub-gasket sheet fed through the first sub-gasket feeding unit to space the first electrode windows apart from each other at particular intervals;
an electrode membrane loading unit installed over the transfer line and configured to form electrode catalyst layers on both faces of an electrolyte membrane, collect an electrode membrane sheet cut in a unit form, and load the electrode membrane sheets onto the first electrode windows of the first sub-gasket sheet;
a second sub-gasket feeding unit installed extraneous to the transfer line and configured to unroll a second sub-gasket sheet wound in a roll form and supply the second sub-gasket sheet to the electrode membrane sheet;
a second cutting unit installed on a part of the second sub-gasket feeding unit and configured to consecutively form second electrode windows in the second sub-gasket sheet fed through the second sub-gasket feeding unit to space the second electrode windows apart from each other at particular intervals;

membrane-electrode assembly (MEA) bonding units installed extraneous to the transfer line and configured to bond together the first sub-gasket sheet, the electrode membrane sheet, and the second sub-gasket sheet mutually stacked while passing the first sub-gasket sheet, the electrode membrane sheet, and the second sub-gasket sheet between a pair of hot rollers;

an MEA rewinder installed in a rear of the MEA bonding units and configured to wind an MEA sheet to which the electrode membrane sheet and the second sub-gasket sheet are bonded on the first sub-gasket sheet by the MEA bonding units in a roll form;

a film rewinder installed on the part of the first sub-gasket feeding unit and configured to recover a protection film of the first sub-gasket sheet and wind the protection film in a roll form;

a second film rewinder installed on the part of the second sub-gasket feeding unit and configured to recover a protection film of the second sub-gasket sheet and wind the protection film in a roll form; and a film unwinder installed on a part of the MEA rewinder and configured to unroll the protection film of a roll form and supply the unrolled protection film to the MEA sheet.

12. The apparatus of claim 11, wherein the electrode membrane loading unit includes a pair of first grippers configured to suction the electrode membrane sheet in a vacuum.

* * * * *